United States Patent
Yatsuda et al.

(10) Patent No.: US 7,143,852 B2
(45) Date of Patent: Dec. 5, 2006

(54) ENGINE COMPARTMENT COVER FOR WORK MACHINE

(75) Inventors: Osamu Yatsuda, Hirakata (JP); Toshio Ibuki, Kyoutanabe (JP); Masahiro Ikeda, Chigasaki (JP); Kuniaki Nakada, Yokohama (JP)

(73) Assignee: Komatsu Ltd., Tokyo (JP)

( * ) Notice: Subject to any disclaimer, the term of this patent is extended or adjusted under 35 U.S.C. 154(b) by 320 days.

(21) Appl. No.: 10/815,767

(22) Filed: Apr. 2, 2004

(65) Prior Publication Data

US 2004/0200649 A1   Oct. 14, 2004

(30) Foreign Application Priority Data

Apr. 10, 2003  (JP) ............... 2003-106621

(51) Int. Cl.
B62D 25/10    (2006.01)

(52) U.S. Cl. .................... 180/69.2; 180/68.1

(58) Field of Classification Search .............. 180/68.1, 180/68.2, 68.3, 69.2, 69.22
See application file for complete search history.

(56) References Cited

U.S. PATENT DOCUMENTS

| | | | |
|---|---|---|---|
| 3,788,418 A * | 1/1974 | Clancy et al. .............. | 180/68.4 |
| 3,960,238 A | 6/1976 | McClure et al. | |
| 4,071,009 A * | 1/1978 | Kraina .................... | 123/198 E |
| 4,081,050 A * | 3/1978 | Hennessey et al. ......... | 180/233 |
| 5,174,406 A | 12/1992 | Lee | |
| 5,199,522 A * | 4/1993 | Martenas et al. .......... | 180/68.3 |
| 5,678,648 A * | 10/1997 | Imanishi et al. ........... | 180/68.1 |
| 5,816,351 A * | 10/1998 | Akira et al. ............... | 180/68.1 |
| 6,129,056 A | 10/2000 | Skeel et al. | |
| 6,167,976 B1 | 1/2001 | O'Neill et al. | |
| 6,390,770 B1 * | 5/2002 | Takeshita .................... | 415/119 |
| 6,435,264 B1 * | 8/2002 | Konno et al. .................. | 165/41 |
| 6,655,486 B1 | 12/2003 | Oshikawa et al. | |
| 6,745,860 B1 * | 6/2004 | Yabe .......................... | 180/68.1 |
| 6,901,903 B1 * | 6/2005 | Nakajima et al. ........ | 123/198 E |
| 2003/0066209 A1 | 4/2003 | Takezaki et al. | |
| 2004/0262061 A1 * | 12/2004 | Bahr et al. .................. | 180/69.2 |

FOREIGN PATENT DOCUMENTS

| | | |
|---|---|---|
| JP | 11-182262 | 7/1999 |
| JP | 2003-113715 | 4/2003 |

* cited by examiner

Primary Examiner—Jeff Restifo
(74) Attorney, Agent, or Firm—Wenderoth, Lind & Ponack, L.L.P.

(57) ABSTRACT

An engine compartment cover for a work machine includes left and right-hand side covers for covering the sides of an engine, and a hood for covering the top of the engine. The engine compartment cover serves to enclose the engine and demarcate an engine compartment and is capable of suppressing the noise at the operator's ear level caused by the engine operating noise passing through the engine compartment cover as far as possible, whereby the level of quietness in the operator cab can be improved. In the engine compartment cover for a work machine, the hood has a box-type structure including an exterior top plate, side plates surrounding the whole perimeter of the exterior top plate, and a bottom plate opposed to the exterior top plate, and air inlet holes are provided in the side plates only, whilst an air outlet hole is provided in the bottom plate only, in such a manner that external air is drawn into the interior of the hood via the air inlet holes and air is introduced into the engine compartment via the air outlet hole.

3 Claims, 11 Drawing Sheets

ENGINE COMPARTMENT COVER FOR WORK MACHINE

BACKGROUND OF THE INVENTION

1. Field of the Invention

The present invention relates to an engine compartment cover for a work machine which comprises left and right-hand side covers and an upper hood, and serves to demarcate an engine compartment, and more particularly, to an engine compartment cover provided with a ventilation opening for allowing air to circulate inside the engine compartment.

2. Description of the Related Art

For example, a tractor, bulldozer, or the like, which is one type of a work machine, comprises an engine and power train mounted on a main frame equipped with an undercarriage, and is also provided with an operator cab in which an operator (driver) can sit.

Furthermore, the engine is covered by an engine compartment cover, and this engine compartment cover comprises a pair of left and right-hand side covers for covering the sides of the engine, and a hood for covering the top of the engine, and together with a front grille, and the like, this engine compartment cover serves to demarcate the engine compartment.

Moreover, in the aforementioned engine compartment cover, a ventilation opening is provided in order to allow air to circulate inside the engine compartment, with the object of cooling the engine, and the like, a composition being adopted, for example, wherein external air is taken into the engine compartment via the front grille positioned on the front side thereof, and air is discharged from the engine compartment to the outside, via a ventilation opening provided in the hood of the engine compartment cover.

In a composition in which a ventilation opening is provided in the hood of the engine compartment cover, as described above, the noise generated by the sound of the engine during operation travels from the inside of the engine compartment, through the aforementioned ventilation opening, and is radiated upwards from the engine compartment cover.

On the other hand, in an earthmoving vehicle, such as a tractor, bulldozer, or the like, if the engine is mounted to the front side of the operator cab, then the hood of the engine compartment cover is laid out in such a manner that it only reaches to a position below the operator's line of sight, in order to ensure the field of vision of the operator sitting in the operator cab.

Therefore, since the engine noise is radiated upwards from the ventilation opening provided in the hood of the engine compartment cover as described above, then the noise to which the operator sitting in the operator cab is exposed, in other words, the noise at the level of the operator's ears, is very loud, and therefore problems occur in that the working efficiency of the operator declines markedly due to the loss of quietness in the operator cab.

The present invention was devised with the foregoing in view, an object thereof being to provide an engine compartment cover for a work machine whereby the noise reaching the operator's ear level caused by engine noise passing through the engine compartment cover is suppressed as far as possible, thereby making it possible to enhance the level of quietness in the operator cab.

SUMMARY OF THE INVENTION

The engine compartment cover for a work machine relating to one aspect of the present invention is an engine compartment cover for a work machine, comprising left and right-hand side covers covering sides of an engine, and a hood for covering a top of the engine, the engine compartment cover enclosing the engine and demarcating an engine compartment. The hood has a box-type structure comprising an exterior top plate, side plates surrounding the whole perimeter of an exterior top plate, and a bottom plate opposing the exterior top plate. Air inlet openings are provided only in the side plates, an air outlet opening is provided only in the bottom plate, and external air being drawn inside the hood via the air inlet openings and air is introduced into the engine compartment via the air outlet opening.

According to the foregoing composition, since air inlet openings are provided only in the side plates of the hood, and since an air outlet opening is provided only in the bottom plate of the hood, in other words, since no opening for taking in or letting out air is provided in the exterior top plate of the hood, then although the engine noise inside the engine compartment is radiated in sideways directions via the air inlet openings in the hood, it is not radiated in an upward direction from the exterior top plate of the engine compartment cover.

Therefore, according to the engine compartment cover for a work machine relating to the present invention, the noise at the operator's ear level caused by the engine operating noise passing through the engine compartment cover is suppressed as far as possible, and consequently, the level of quietness in the operator cab can be improved markedly.

The engine compartment cover for a work machine relating to a second aspect of the present invention is the engine compartment cover for a work machine relating to the first aspect of the invention, wherein a guide duct for guiding air from the air outlet opening to a prescribed location is provided on the bottom plate of the hood.

According to the foregoing composition, since no opening for taking in or letting out air is provided in the top of the hood, the noise at the operator's ear level is suppressed as far as possible, and the level of quietness in the operator cab is improved, in addition to which, since a guide duct is provided in the bottom plate of the hood, the external air can be guided reliably to a prescribed location inside the engine compartment, for example, to the radiator, or the like.

The engine compartment cover for a work machine relating to a third aspect of the present invention is the engine compartment cover for a work machine relating to the first aspect of the invention, wherein sound insulating members for attenuating a noise radiated externally from the engine compartment are provided on the surfaces of components in the hood forming the passage of air from the outside to the engine compartment.

According to the foregoing composition, since no opening for taking in or letting out air is provided in the top of the hood, the noise at the operator's ear level is suppressed as far as possible, and the level of quietness in the operator cab is improved, in addition to which, since the level of noise radiated in sideways directions from the air inlet openings is reduced, the noise at the operator's ear level caused by this noise being reflected upwards from its sideways direction is also suppressed, and furthermore, the ambient noise can also be reduced significantly.

DETAILED DESCRIPTION OF THE PREFERRED EMBODIMENTS

Below, the present invention is described in detail on the basis of the drawings which illustrate an embodiment.

FIG. 1 to FIG. 13 show one embodiment in which the present invention is applied to an engine compartment cover of an earthmoving vehicle, being one type of a work machine, and more specifically, the engine compartment cover of a bulldozer.

Figure 1:
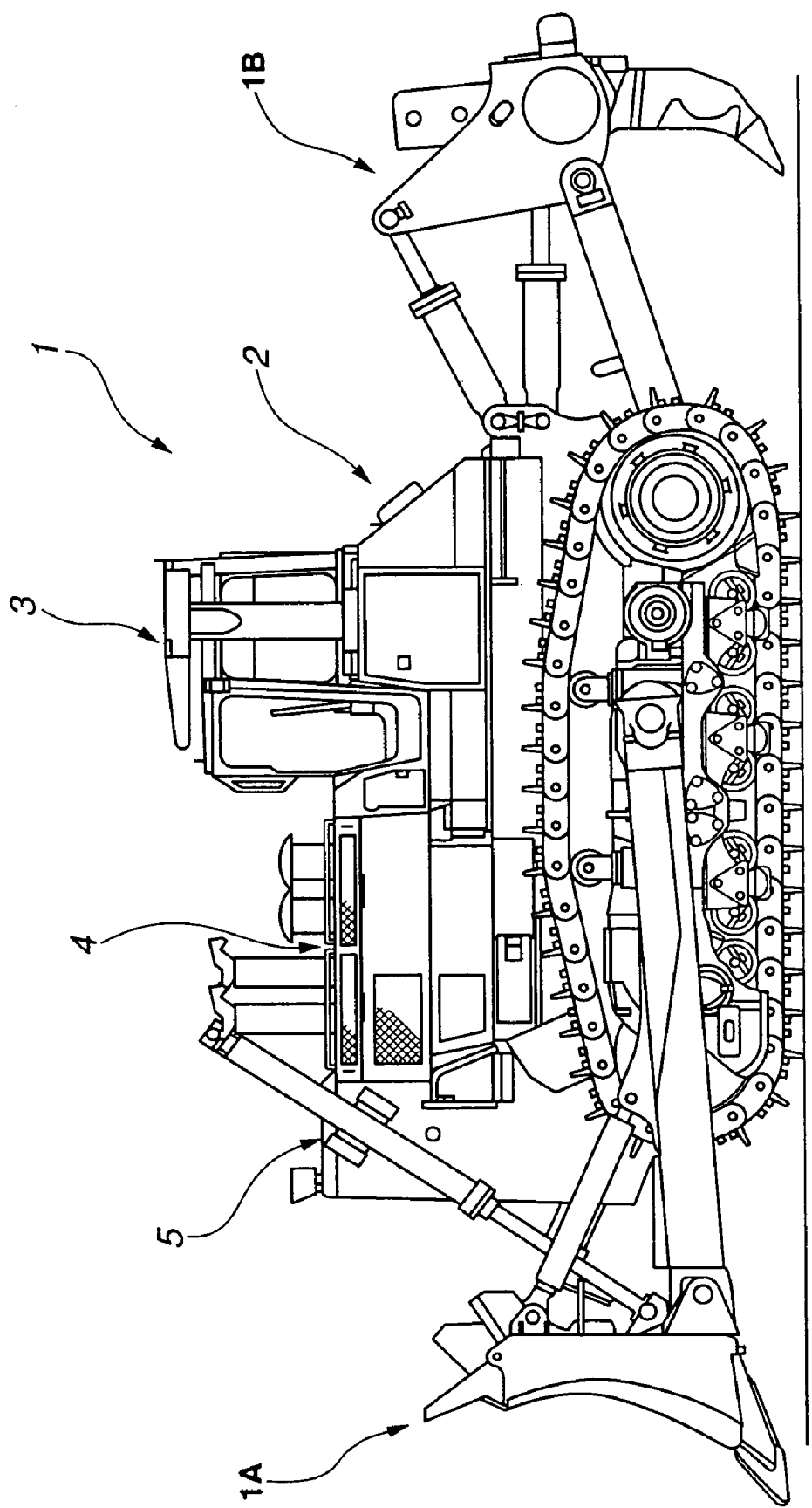
FIG. 1 is a side view of the overall composition of a bulldozer showing one embodiment of a work machine to which the present invention is applied.
Figure 2:
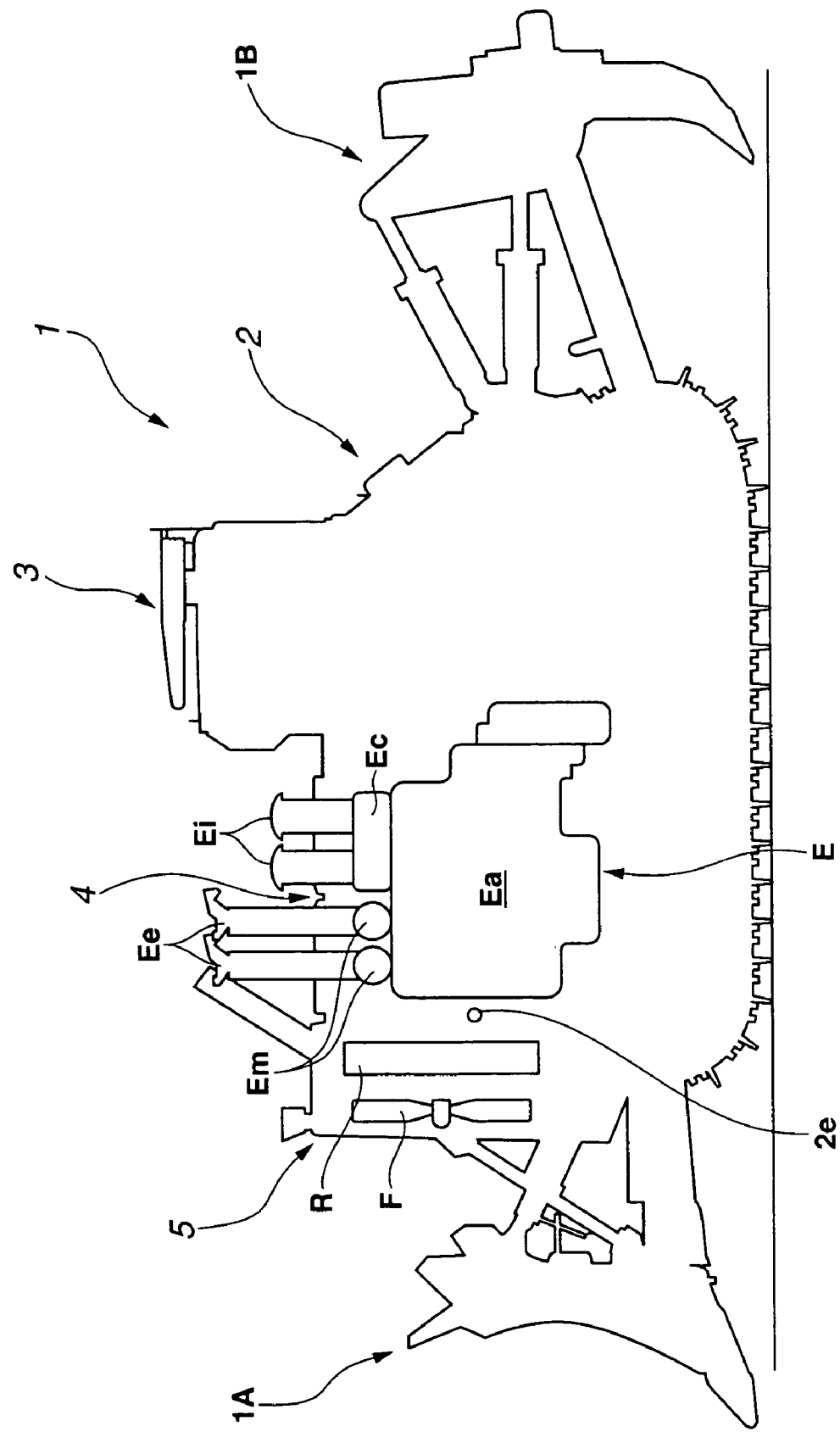
FIG. 2 is a conceptual view showing the layout of the engine, and the like, mounted in the bulldozer shown in FIG. 1.

As shown in FIG. 1 and FIG. 2, the bulldozer (work machine) 1 has a front work tool (blade device) 1A and a rear work tool (ripper device) 1B fitted to a tractor 2 which forms the main body of the vehicle. An engine E, and the like, is mounted in the front region of the main frame of the tractor 2 which is equipped with an undercarriage, whilst an operator cab 3 in which an operator can ride is provided in the rear region thereof.

The engine E comprises, in addition to an engine main body Ea, an intake pipe Ei, an air cleaner Ec, a muffler Em and an exhaust pipe Ee, and the like, and it is accommodated inside an engine compartment 2e which is demarcated by an engine compartment cover 4, as described hereinafter.

Moreover, a radiator R and cooling fan F are provided at the front side of the engine E, and this radiator R and cooling fan F are accommodated inside a front grille 5 provided in front of the engine compartment cover 4.

Here, the engine compartment 2e of the tractor 2 is demarcated by the engine compartment cover 4, together with the operator cab 3 which is positioned to the rear side of the engine compartment cover 4, and the front grille 5 which is positioned to the front side thereof, the engine E being accommodated inside this engine compartment 2e without being exposed externally.

Figure 3:
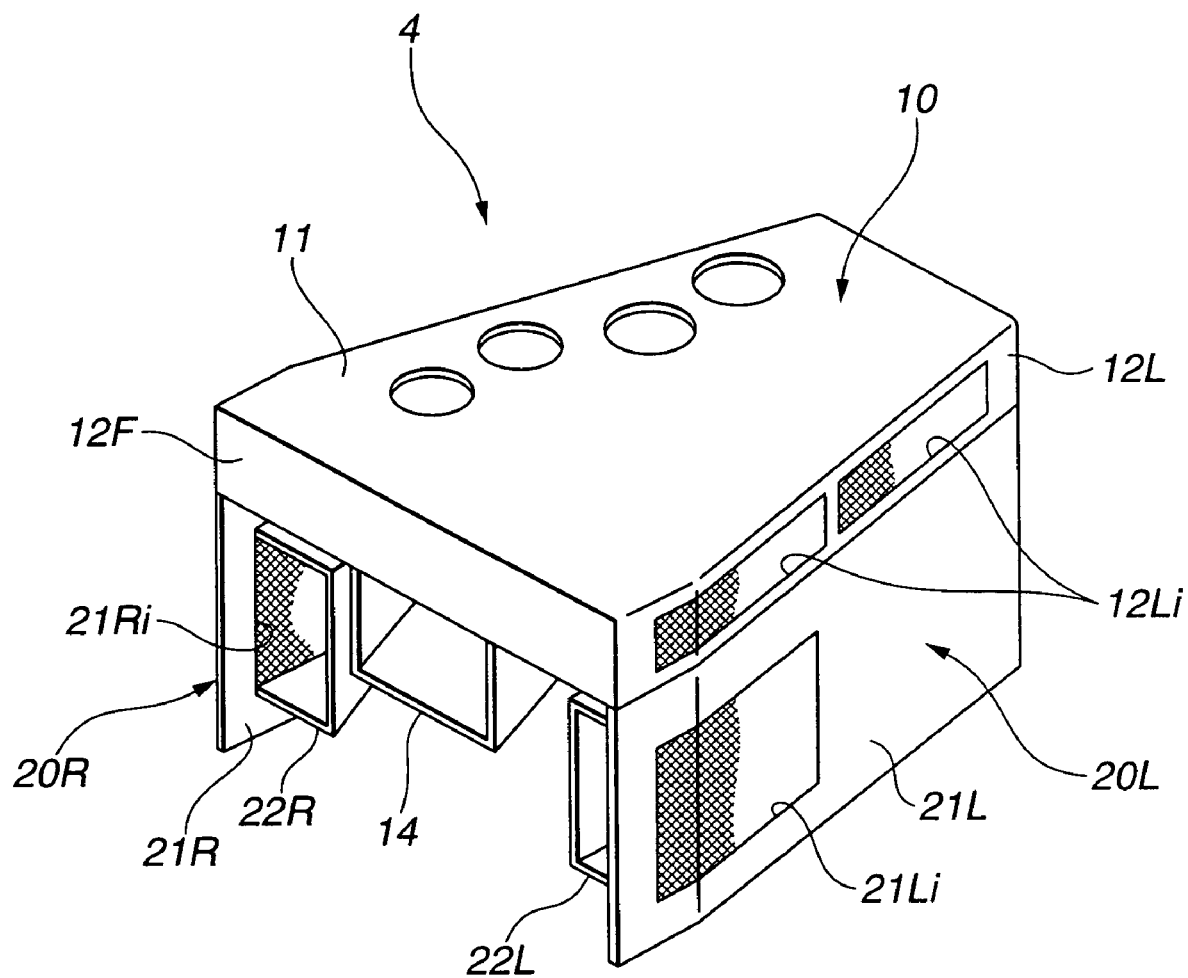
FIG. 3 is an oblique external view showing an engine compartment cover in the bulldozer in FIG. 1.
Figure 4A:
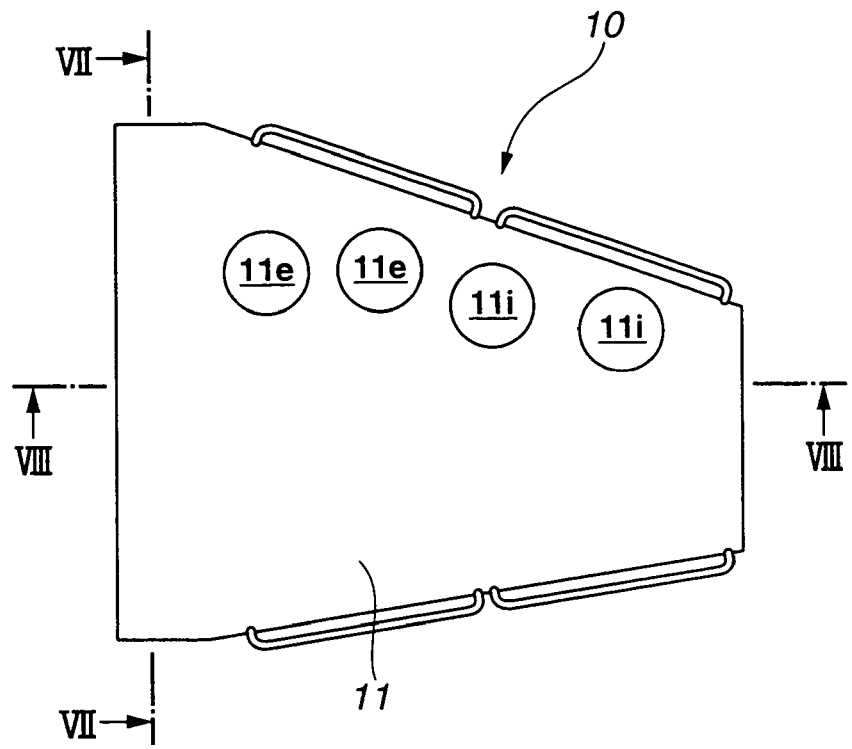
FIGS. 4A and 4B are a top view and a bottom view showing the hood of the engine compartment cover in FIG. 3.
Figure 4B:
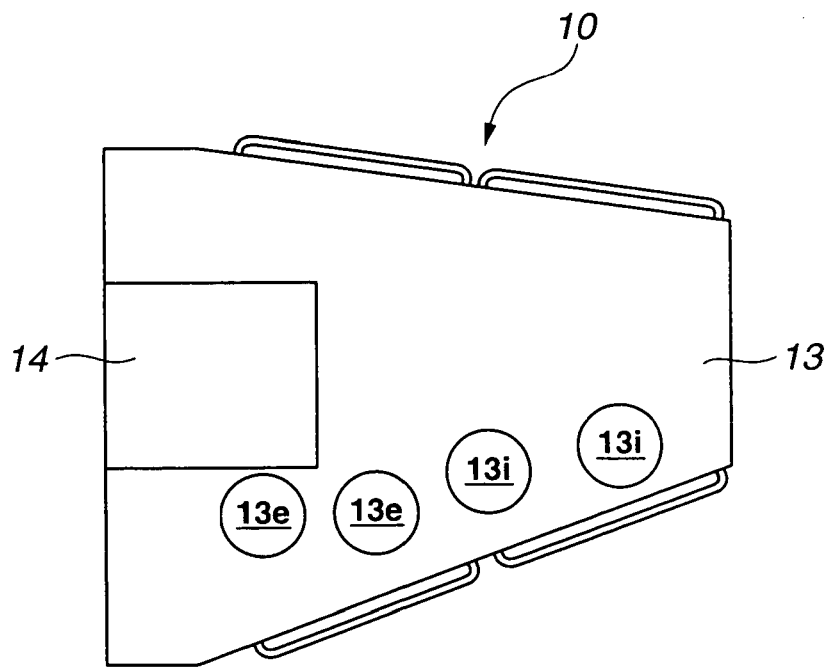
Figure 5A:
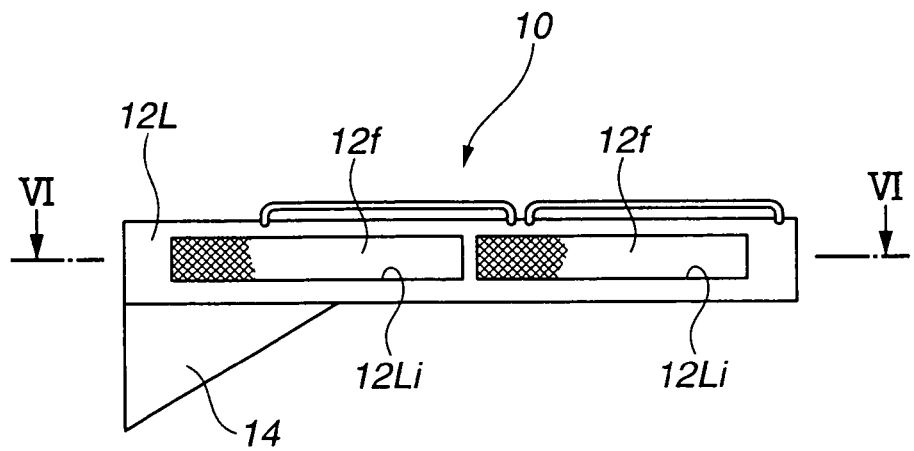
FIGS. 5A, 5B and 5C are a side view, a front view and a rear view showing the hood of the engine compartment cover in FIG. 3.
Figure 5B:
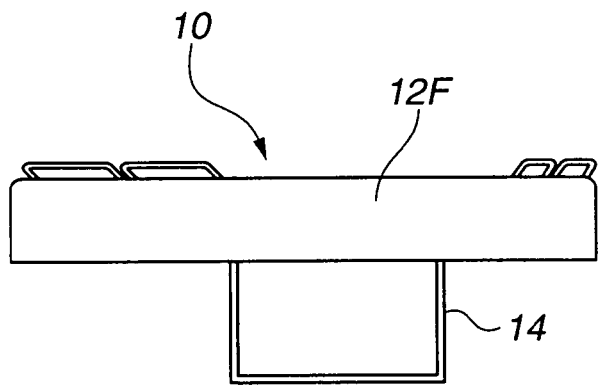
Figure 5C:
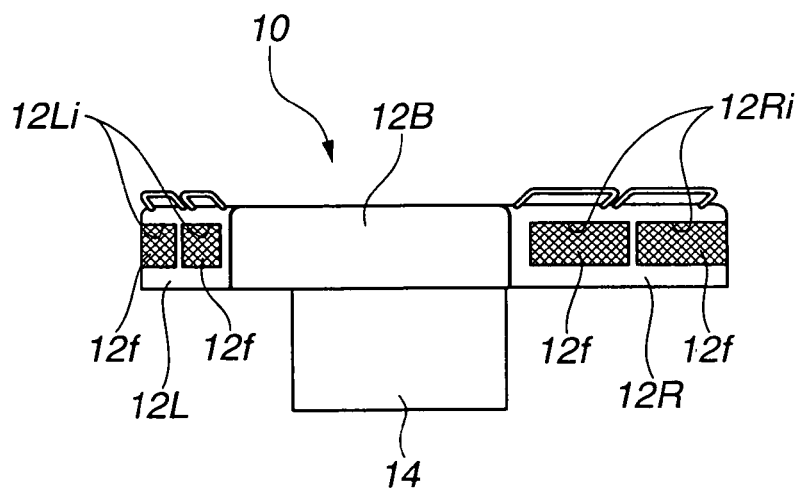
Figure 6:
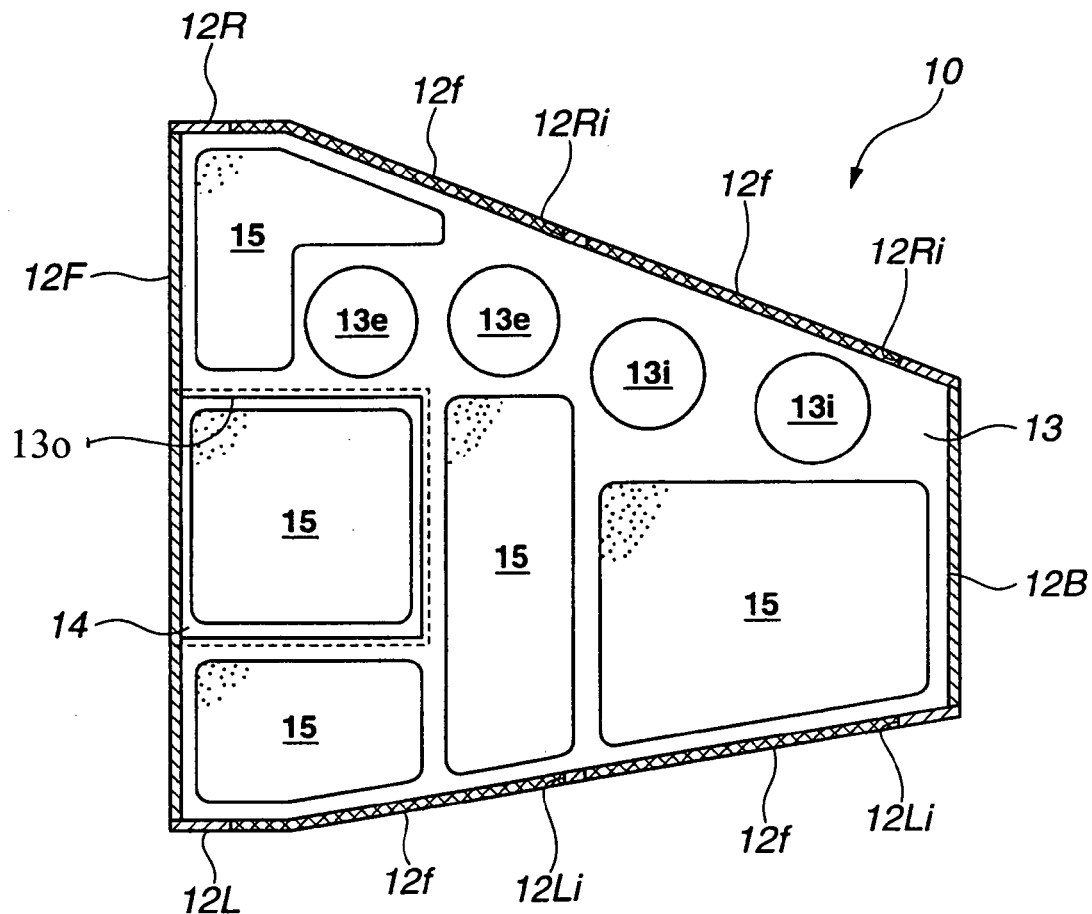
FIG. 6 is a cross-sectional view along line VI—VI in FIG. 5A.

As shown in FIG. 3, the engine compartment cover 4 is equipped with a hood 10 covering the top of the engine E (see FIG. 2), a side cover 20R covering the right-hand side of the engine E and a side cover 20L covering the left-hand side of the engine E.

As shown in FIG. 3 to FIG. 8, the hood 10 comprises a top plate (outer top plate) 11 which forms the upper exterior of the engine compartment cover 4, and the whole perimeter of this top plate 11 is surrounded by a left-hand side plate (side plate) 12L, a right-hand side plate (side plate) 12R, a front side plate (side plate) 12F and a rear side plate (12B).

Moreover, the hood 10 comprises a bottom plate 13 which opposes the top plate 11, and by assembling the top plate 11, the left-hand side plate 12L, the right-hand side plate 12R, the front side plate 12F, the rear side plate 12B and the bottom plate 13 in the form of a box, the hood 10 is formed with an empty box-shaped structure.

Intake holes 11i and exhaust holes 11e are formed in the top plate 11, and intake holes 13i and exhaust holes 13e are formed in the bottom plate 13, but when the engine compartment cover 4 is installed in the prescribed position (see FIG. 1), these intake holes 11i, 13i and exhaust holes 11e, 13e are closed off by the intake pipe Ei and the exhaust pipe Ee of the engine E (see FIG. 2).

Air inlet openings 12Li are formed in the left-hand side plate 12L of the hood 10, and air inlet openings 12Ri are formed in the right-hand side plate 12R of the hood 10. Punched metal 12f forming a filter for preventing infiltration of foreign material is installed respectively on the air inlet openings 12Li and the air inlet openings 12Ri.

Moreover, an air outlet opening 13o is formed in the bottom plate 13 of the hood 10, towards the front side thereof (towards the left-hand side in FIG. 6), and furthermore, a guide duct 14 is installed on the lower face of the bottom plate 13, in such a manner that it surrounds the air exhaust outlet 13o.

Figure 9:
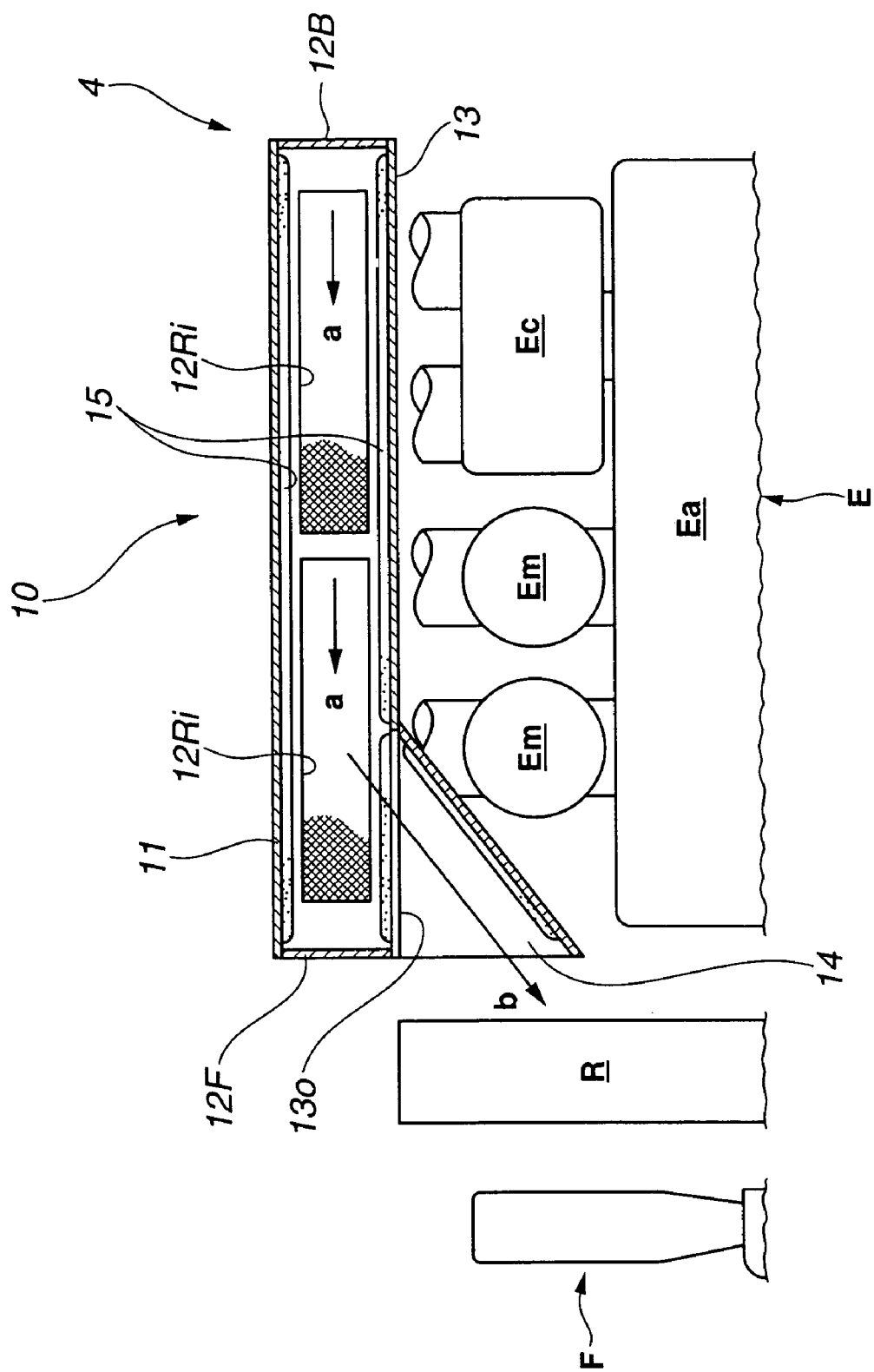
FIG. 9 is a conceptual diagram showing the flow of air passing through the hood of the engine compartment cover in FIG. 3.
Figure 10A:
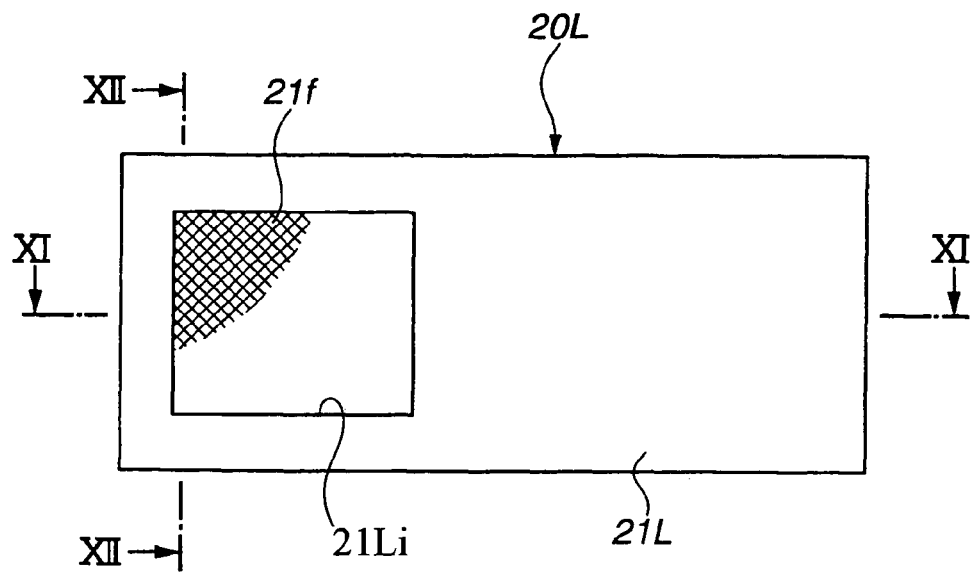
FIGS. 10A, 10B and 10C are a side view, a top view and a front view showing a side cover of the engine compartment cover in FIG. 3.
Figure 10B:
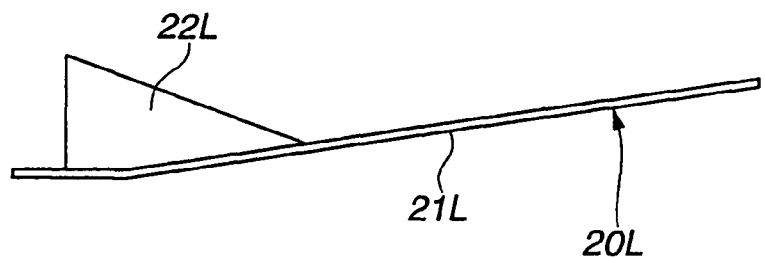
Figure 10C:
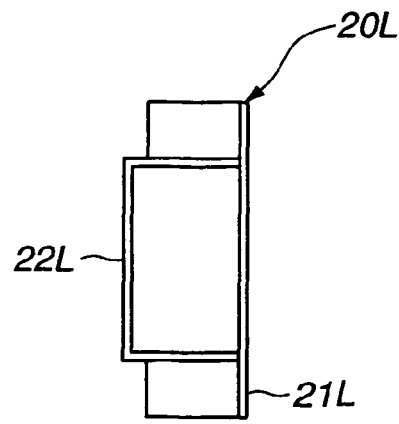

The guide duct 14 serves to guide air from the air outlet opening 13o towards a prescribed location, which in the case of this embodiment, is the radiator R. As shown in FIG. 9, the radiator R is provided in a position whereby, when the engine compartment cover 4 is installed in a prescribed position (see FIG. 1), the engine compartment 4 faces the vicinity of the rear side of the radiator R.

Moreover, as shown in FIG. 6 to FIG. 9, sound absorbing sheets (sound insulating members) 15 for attenuating the noise radiated externally from the engine compartment 2e (see FIG. 2) are attached to the lower face of the top plate 11 of the hood 10, the upper face of the bottom plate 13, and a portion of the inner face of the guide duct 14. In other words, the sound absorbing sheets 15 are attached to the surfaces of the components that form the air passage.

The sound absorbing sheets 15 are made from a suitable material having desired sound insulating properties (sound absorbing properties and vibration damping properties), such as sheets of urethane foam, polyethylene foam, rubber sponge material, or non-woven fabric made of PET (polyethylene terephthalte), or the like.

As shown in FIG. 3 and FIG. 10 to FIG. 13, the side cover 20L in the engine compartment cover 4 has a side panel 21L covering the left-hand side of the engine E, and this side panel 21L is supported swingably with respect to the hood 10.

Moreover, an air inlet opening 21Li is formed towards the front side of this side panel 21L, and punched metal 21f forming a filter for preventing infiltration of foreign material is attached to this air inlet opening 21Li.

Furthermore, a guide duct 22L is installed on the inner face of the side panel 21L in such a manner that it surrounds the air inlet opening 21Li. The guide duct 22L is provided in a position whereby, when the engine compartment cover 4 is installed in a prescribed position (see FIG. 1), the guide duct 22L faces the vicinity of the rear side of the radiator R, as illustrated in FIG. 13.

Sound absorbing sheet 23 made from a urethane foam sheet material, for example, is attached to a portion of the inner face of the guide duct 22L. In other words, the sound absorbing sheet 23 is attached to the surfaces of the component that form the air passage.

Figure 13:
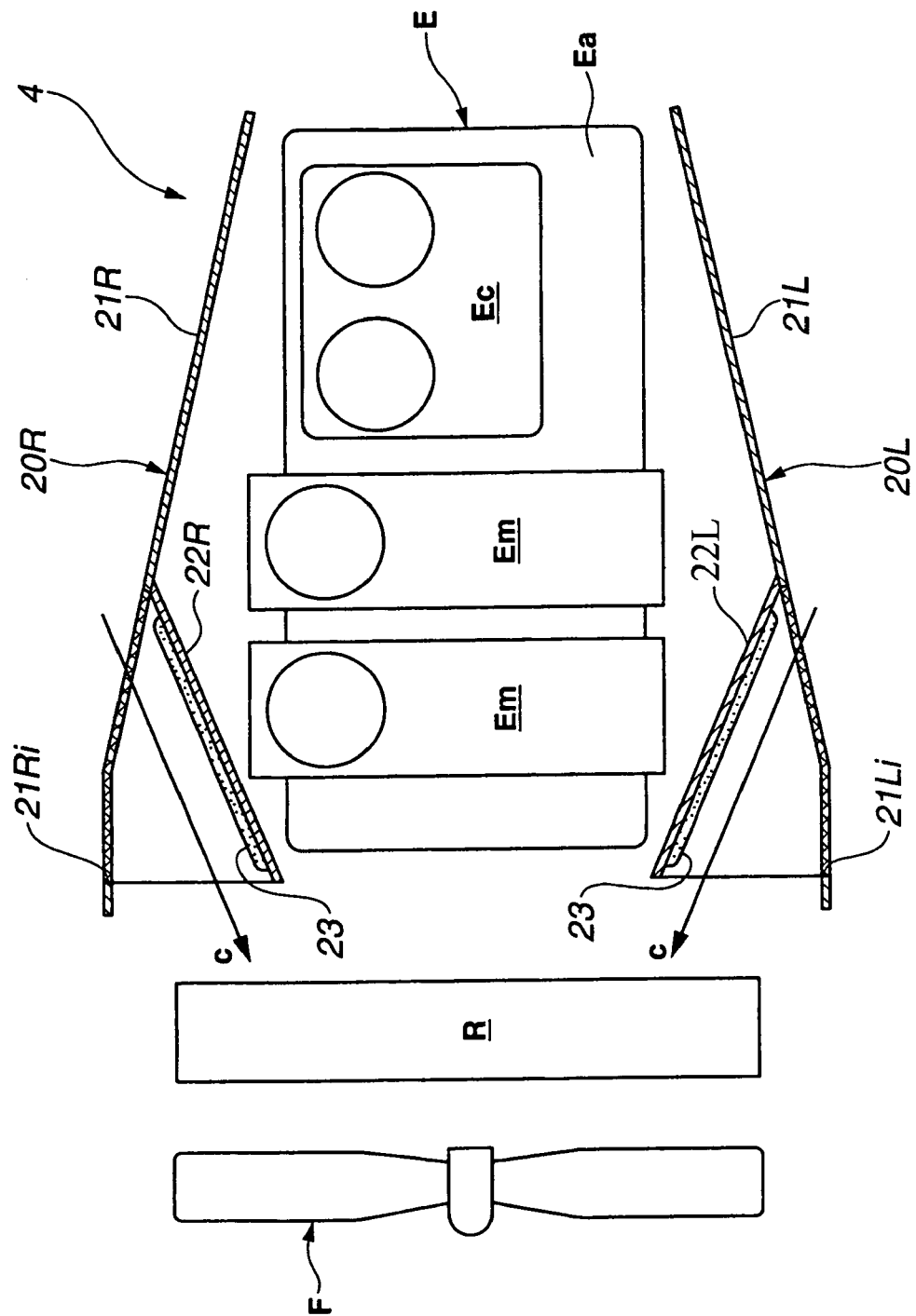
FIG. 13 is a conceptual diagram showing the flow of air passing through the side cover of the engine compartment cover in FIG. 3.

As shown in FIG. 3 and FIG. 13, the side cover 20R in the engine compartment cover 4 has a side panel 21R covering the right-hand side of the engine E, and this side panel 21R is supported swingably with respect to the hood 10.

Moreover, an air inlet opening 21Ri is formed towards the front side of this side panel 21R, and punched metal 21f forming a filter for preventing infiltration of foreign material is attached to this air inlet opening 21Ri.

Furthermore, a guide duct 22R is installed on the inner face of the side panel 21R in such a manner that it surrounds the air inlet opening 21Ri. The guide duct 22R is provided in a position whereby, when the engine compartment cover 4 is installed in a prescribed position (see FIG. 1), the guide duct 22 faces the vicinity of the rear side of the radiator R, as illustrated in FIG. 13.

Sound absorbing sheet 23 made from a urethane foam sheet material, for example, is attached to a portion of the inner face of the guide duct 22R. In other words, sound absorbing sheet 23 is attached to the surfaces of the component that forms the air passage.

Figure 7:
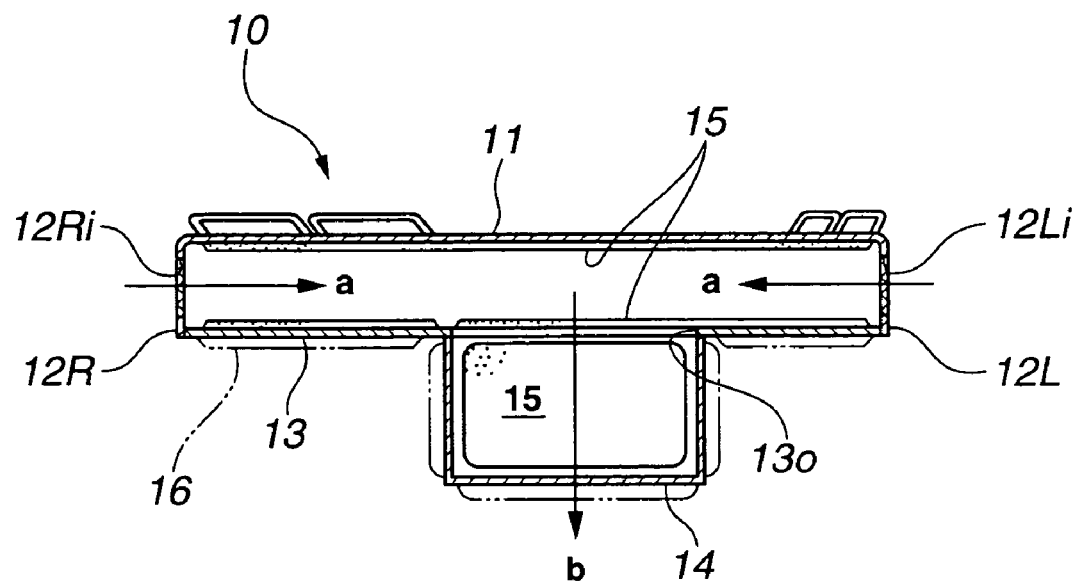
FIG. 7 is a cross-sectional view along line VII—VII in FIG. 4A.

When the bulldozer 1 provided with the engine compartment cover 4 described above starts operation, along with the driving of the cooling fan F, outside air is drawn inside the hood 10 of the engine compartment cover 4 via the air inlet openings 12Li and the air inlet openings 12Ri, as indicated by the arrows, a, in FIG. 7 and FIG. 9. The air is subsequently discharged via the air outlet opening 13o and is guided by the guide duct 14 towards the radiator R, as indicated by arrow b.

Here, temperature rise in the cooling air is prevented, as far as possible, by guiding the external air to the radiator R via the interior of the hood 10 and the guide duct 14, without exposing the air to the heat sources of the engine main body Ea and the muffler Em, and the like. Therefore, it is possible to significantly improve the cooling efficiency of the radiator R.

Furthermore, in the side covers 20L, 20R of the engine compartment cover 4, along with the driving of the cooling fan F, external air passes through the air inlet openings 21Li, 21Ri, as indicated by the arrows c in FIG. 13, and is guided to the radiator R by the guide ducts 22L, 22R.

Here, temperature rise in the cooling air is prevented, as far as possible, by guiding the external air to the radiator R via the guide ducts 22L, 22R in the side covers 20L, 20R, without exposing the air to the heat sources of the engine main body Ea and the muffler Em, and the like. Therefore, it is possible to significantly improve the cooling efficiency of the radiator R.

If noise is generated in association with the running of the engine E, whilst the bulldozer 1 is in an operating state, then noise that has infiltrated from the guide duct 14 and into the hood 10 of the engine compartment cover 4, via the air outlet opening 13o, will be radiated externally via the respective air inlet openings 12Li and the air inlet openings 12Ri.

Here, in the hood 10 described above, since the air inlet openings 12Li and the air inlet openings 12Ri are provided respectively in the left-hand side plate 12L and the right-hand side plate 12R, then although the engine operating noise inside the engine compartment 2e is radiated in sideways directions via the air inlet openings 12Li, 12Ri, the engine operating noise inside the engine compartment 2e will not be radiated in an upward direction from the top plate 11 of the engine compartment cover 4, because no openings for taking in or letting out air are provided in the top plate of the hood 10.

Therefore, the noise to which the operator, who is sitting in the operator cab 3 and has a line of sight positioned above the engine compartment cover 4, is exposed, in other words, the noise at the operator's ear level is reduced as far as possible, and consequently, the level of quietness inside the operator cab 3 is markedly improved.

Furthermore, in the hood 10 described above, since sound absorbing sheets 15 for attenuating noise are attached to the lower face of the top plate 11, the upper face of the bottom plate 13, and a portion of the inner faces of the guide duct 14, or in other words, the surfaces of the components that form the air passage, then the level of noise radiated in a sideways direction from the air inlet openings 12Li, 12Ri is decreased. Consequently, the noise at the operator's ear level caused by this noise being reflected upwards from its sideways direction is suppressed, in addition to which, the ambient noise level can also be reduced significantly.

Here, in the hood 10 described above, the sound absorbing sheet 15 can also be attached to the whole area of the inner faces of the left-hand side plate 12L and the right-hand side plate 12R, and the inner faces of the front side plate 12F and the rear side plate 12B, as well as the inner faces of the guide duct 14. Thus, the sound absorbing sheet 15 can be attached over a wide range to the surfaces of the components forming the air passage, and therefore the noise suppression effects can be enhanced dramatically.

Figure 8:
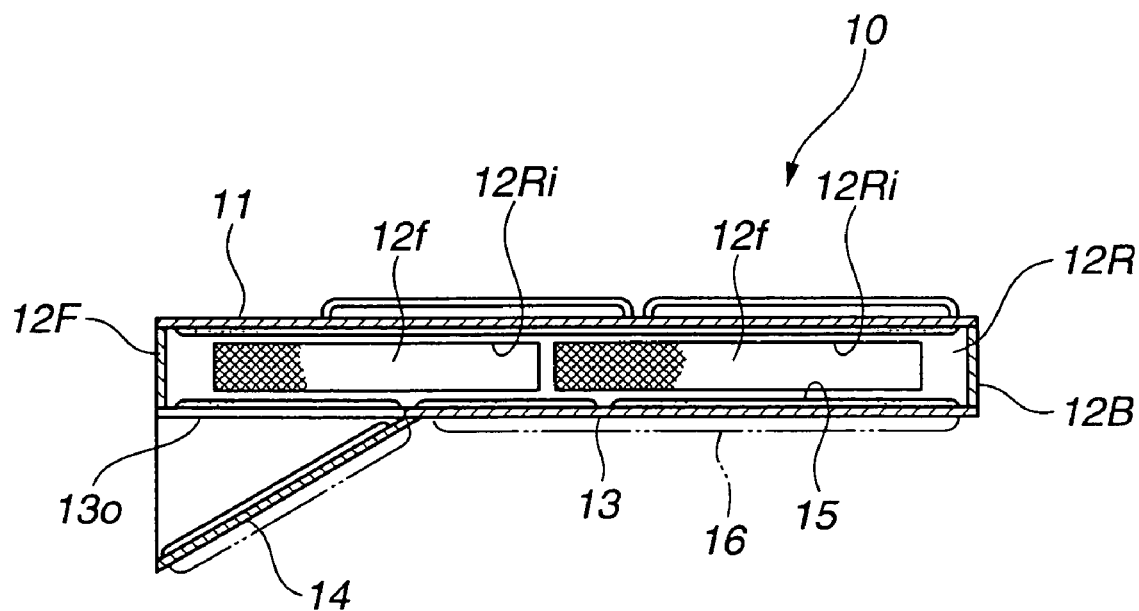
FIG. 8 is a cross-sectional view along line VIII—VIII in FIG. 4A.

Furthermore, it is also possible to attach sound insulating sheets 16 made from a suitable sound insulating material, to the surfaces of the bottom plate 13 of the hood 10 and the guide duct 14 that face the engine compartment 2e, as illustrated by the dashed lines in FIG. 7 and FIG. 8, for example, in addition to the surfaces of the components that form the air passage.

According to the composition described above, since the noise propagated to the hood 10, and the like, from the interior of the engine compartment 2e is attenuated by the sound insulating sheets 16 then it is possible to further reduce the level of noise which escapes externally via the hood 10.

Here, since the sound insulating sheets 16 are exposed directly to the heat of the engine E, they are desirably made from a non-woven fabric of PET, or the like, which has excellent thermal resistance. Moreover, since the sound absorbing sheets 15. attached to the surfaces of the components forming the air passage are not exposed directly to the heat of the engine E, they are desirably made from urethane foam, which has inferior thermal resistance but is less expensive.

Furthermore, when the bulldozer 1 is operating, the noise generated by the operation of the engine E is radiated externally in sideways directions, from the respective guide ducts 22L, 22R in the side cover 20L and the side cover 20R of the engine compartment cover 4, via the respective air inlet openings 21Li, 21Ri.

Here, in the side covers 20L, 20R, since sound absorbing sheet 23 is attached to a portion of the inner faces of the guide ducts 22L, 22R, in other words, the surfaces of the components that form the air passage, then the level of noise radiated in a sideways direction from the air inlet openings 21Li, 21Ri is decreased. Consequently, the noise at the operator's ear level caused by this noise being reflected upwards from its sideways direction is suppressed, in addition to which, the ambient noise level can also be reduced significantly.

Furthermore, in the side covers 20L, 20R, it is also possible to attach sound absorbing sheet 23 to the whole region of the inner faces of the guide ducts 22L, 22R, and by attaching sound absorbing sheet 23 over a wide range in this way, it is possible to further enhance the noise suppression effects.

Figure 11:
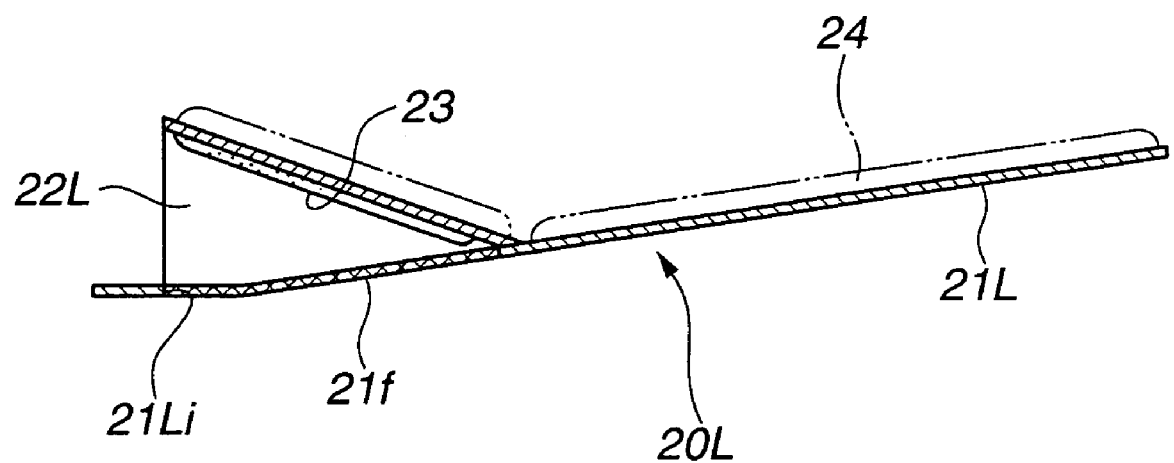
FIG. 11 is a cross-sectional view along line XI—XI in FIG. 10A.
Figure 12:
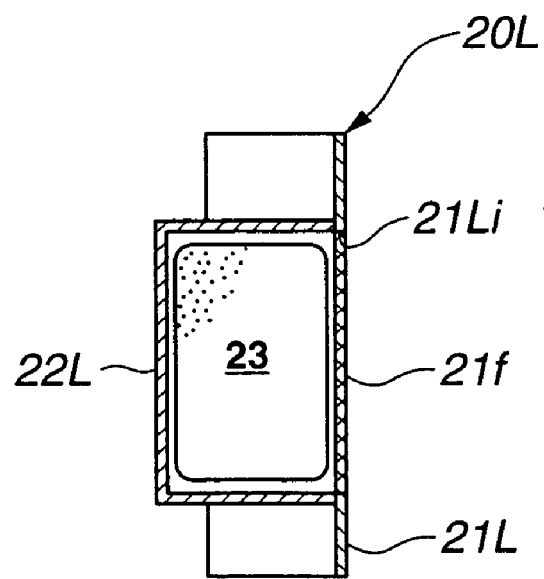
FIG. 12 is a cross-sectional view along line XII—XII in FIG. 10A.

Furthermore, it is also possible to attach sound insulating sheets 24 made from a suitable sound insulating material, to the surfaces of the side panels 21L, 21R and the guide ducts 22L, 22R in the side cover 20L (20R) that face the engine compartment 2e, as illustrated by the dashed lines in FIG. 11, for example, in addition to the surfaces of the components that form the air passage.

According to the composition described above, since the noise propagated to the side covers 20L, 20R from the interior of the engine compartment 2e is attenuated by the sound insulating sheets 24, then it is possible to further reduce the level of noise which escapes externally via these side covers 20L, 20R.

The embodiment described above is related to an example wherein the present invention is applied to a bulldozer, which is one type of an earthmoving vehicle, but the present invention may of course also be applied effectively to various types of construction vehicles other than a bulldozer, such as a hydraulic shovel, or the like, for example.

Furthermore, the present invention may of course be applied effectively to various types of work machine, other than construction vehicles such as bulldozers, hydraulic shovels, or the like, which have an engine enclosed by an engine compartment cover, such as various types of agricultural vehicles, such as tractors, or the like, for example.

What is claimed is:

1. An engine compartment cover for enclosing an engine of a work machine and for defining an engine compartment, the cover comprising:

a hood for covering a top of the engine; and
   left and right side covers extending from said hood to cover left and right sides of the engine, said left and right side covers having air inlet openings arranged such that external air is introduced into the engine compartment,
   wherein said hood has a box-type structure and includes an exterior top plate,
      a bottom plate opposed to said exterior top plate,
      left and right side plates extending between said exterior top plate and said bottom plate,
      front and rear side plates extending between said exterior top plate and said bottom plate,
      wherein said hood has air inlet openings provided only in said left and right side plates, and
      wherein said hood has an air outlet opening provided only in said bottom plate, said air inlet openings of said hood and said air outlet opening being arranged such that external air is drawn inside said hood via said air inlet openings of said hood and is introduced into the engine compartment via said air outlet opening.

2. The engine compartment cover according to claim 1, wherein a guide duct for guiding air from said air outlet opening to a prescribed location is provided on said bottom plate of said hood.

3. The engine compartment cover according to claim 1, wherein sound insulating members for attenuating a noise radiated externally from the engine compartment are provided on surfaces of components in said hood constituting a passage of air from the outside to the engine compartment.

* * * * *